US006434633B1

United States Patent
Braun et al.

(10) Patent No.: US 6,434,633 B1
(45) Date of Patent: Aug. 13, 2002

(54) METHOD AND APPARATUS FOR FACILITATING AC-LINK COMMUNICATIONS BETWEEN A CONTROLLER AND A SLOW PERIPHERAL OF A CODEC

(75) Inventors: David P Braun, Irvine; Mark E Miller, Mission Viejo; Randy Nuss, Irvine, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/432,141

(22) Filed: Nov. 2, 1999

(51) Int. Cl.$^7$ .................................................. G06F 3/00
(52) U.S. Cl. ............................ 710/15; 710/23; 710/46; 710/64; 710/266
(58) Field of Search .............................. 710/1, 4, 8, 27, 710/12, 15, 17, 19, 23, 46, 47, 48, 49, 50, 62, 64, 266, 262

(56) References Cited

U.S. PATENT DOCUMENTS

| | | | | |
|---|---|---|---|---|
| 4,641,238 A | * | 2/1987 | Kneib ........................ 364/200 |
| 5,675,770 A | * | 10/1997 | Ogata ........................ 711/173 |
| 5,889,480 A | * | 3/1999 | Kim ............................. 341/50 |
| 5,974,480 A | * | 10/1999 | Qureshi et al. ............... 710/27 |
| 6,016,550 A | * | 1/2000 | Kokkosoulis et al. ....... 713/400 |
| 6,195,766 B1 | * | 2/2001 | Maxwell ...................... 714/38 |
| 6,259,957 B1 | * | 7/2001 | Alexander et al. ........... 700/94 |

* cited by examiner

Primary Examiner—Jeffrey Gaffin
Assistant Examiner—Ri Jue Mai
(74) Attorney, Agent, or Firm—Farjami & Farjami LLP

(57) ABSTRACT

A method and apparatus for facilitating AC-link communications between a controller and a slow peripheral of a codec is disclosed. In one embodiment, the GPIO_INT bit (i.e. bit 0 in slot 12 in the AC-link's SDATA_IN line) is utilized as an interrupt flag to indicate when data requested by the controller from the slow peripheral is returned and is available to be read by the controller. The GPIO_INT bit can also be used to indicate when a write into the slow peripheral is completed. In this embodiment, a "peripheral ready bit" or a "peripheral ready signal" originated from the slow peripheral is used to set the GPIO_INT bit. Another embodiment is directed to controllers which ignore the GPIO_INT bit as a source of interrupt. To accommodate these controllers, one of the GPIO bits is used to send the value of the "peripheral ready bit" to the controller. Upon receipt of the peripheral ready bit as one of the GPIO bits from the codec, the controller would interrupt the host CPU and the host CPU is made aware that the data requested from the slow peripheral is returned and is available to be read. The GPIO bit can also be used to indicate that a write into the slow peripheral has been completed. In yet another embodiment, the software running on the host CPU successively checks the peripheral ready bit, which is a designated bit in one of the codec's vendor reserved registers, to find out when the peripheral ready bit has been set. When the peripheral ready bit is set, and so detected by the software, the software would be alerted to the fact that the register from which data was requested now contains the requested data, and the requested data is then read by the software. The designated bit can also be used to indicate that a write into the slow peripheral has been completed.

36 Claims, 10 Drawing Sheets

Slot #12 in SDATA_IN: I/O (GPIO) STATUS

⟨bit 19⟩⟨bit 18⟩⟨bit 17⟩⟨bit 16⟩⟨bit 15⟩⟨bit 14⟩⟨bit 13⟩⟨bit 12⟩⟨bit 11⟩⟨bit 10⟩⟨bit 9⟩⟨bit 8⟩⟨bit 7⟩⟨bit 6⟩⟨bit 5⟩⟨bit 4⟩⟨bit 3⟩⟨bit 2⟩⟨bit 1⟩⟨bit 0⟩

1036 →        ← 1004

| Bit | Description |
|-----|-------------|
| 19 | opt GPIO / HANDSET_TO_LINE2 relay control |
| 18 | opt GPIO / Line 2 pulse dial |
| 17 | Loop Current Sense Line 2 |
| 16 | Caller ID path enable Line 2 |
| 15 | Ring Detect Line 2 |
| 14 | Off Hook Line 2 |
| 13 | opt GPIO / International Bit 3 / Line 1/2 RS |
| 12 | opt GPIO / International Bit 2 / Line 1/2 DC |
| 11 | opt GPIO / International Bit 1 / Line 1/2 AC |
| 10 | opt GPIO / HANDSET off hook detect |
| 9 | opt GPIO / HANDSET to Line 1 relay control |
| 8 | opt GPIO / Line 1 pulse dial |
| 7 | Loop Current Sense Line 1 |
| 6 | Caller ID path enable Line 1 |
| 5 | Ring Detect Line 1 |
| 4 | Off Hook Line 1 |
| 1-3 | vendor reserved |
| 0 | GPIO_INT |

1002 →

1006 —

AC '97 Recommended Slot 12 GPIO Bit Definitions

METHOD AND APPARATUS FOR FACILITATING AC-LINK COMMUNICATIONS BETWEEN A CONTROLLER AND A SLOW PERIPHERAL OF A CODEC

This application is related to a co-pending application, entitled "method and apparatus for addressing and controlling expansion devices through an AC-link and a codec," Ser. No. 09/432,434, Filed Nov. 2, 1999, and assigned to the assignee of the present application. The disclosure contained in that related application is hereby incorporated fully by reference into the present application.

BACKGROUND OF THE INVENTION

1. Field of the Invention

The present invention is in the field of computers and signal processing systems and circuits. More particularly, the invention is in the field of interfacing with peripherals through a codec.

2. Background Art

A codec (COder-DECoder) is a circuit that converts analog signals to digital code and vice versa using conversion methods such as PCM (Pulse Code Modulation). A codec typically includes both analog to digital and digital to analog conversion circuits. FIG. 1 is a prior art diagram illustrating how a codec might be connected to a motherboard and in particular to a controller. Motherboard 110 is a modem PC motherboard. System logic 112 resides on motherboard 110 and is coupled to the remaining components on the motherboard primarily through a PCI (Peripheral Component Interconnect) bus 114. A host CPU (not shown in any of the Figures) is typically located in system logic 112. Controller 116 communicates with system logic 112 through PCI bus 114. In FIG. 1, controller 116 is shown as a stand-alone device. However, controller 116 could be embedded or incorporated into other portions of the PC system including the system logic.

A riser 128 houses other components in FIG. 1. Riser 128 complies with the industry's standard specification for an Audio/Modem Riser (or "AMR"). The AMR specification defines an industry standard form factor for Audio, Audio/Modem or just Modem risers. The AMR specification defines riser mechanical and electrical requirements for certain systems using what is called an AC-link ("Audio Codec link") interface as one of the connections between the riser and the motherboard.

Referring to FIG. 1, riser 128 includes codec 126. When riser 128 is plugged into motherboard 110, codec 126 communicates with controller 116 through AC-link 124, AMR interface connectors 122 and 120, and AC-link 118. Alternatively, the combination of AC-link 124, AMR interface connectors 122 and 120, and AC-link 118 can be thought of simply as a single AC-link connecting controller 116 to codec 126.

Reference is made to FIG. 2 which shows controller 216 that is coupled to codec 226 through AC-link 218. Codec 226 includes codec register set 230. Codec register set 230 is utilized by system and circuit design engineers for various control functions such as for configuring the codec or for setting up the codec to record a certain input such as a CD ROM input. As further examples, the registers in codec register set 230 are used for setting headphone volume, PC beep volume, microphone volume, CD volume, video volume, record gain, 3D control, audio status, audio sample rate control, modem status, modem DAC/ADC level control, GPIO (General Purpose Input/Output) pin configuration, GPIO pin polarity and type, power management, as well as many other codec functions.

Typical codecs, such as those complying with the Intel® AC '97 specification entitled "AC '97 Component Specification," Revision 2.1, published by Intel® Corporation on May 22, 1998 (or simply "AC '97 specification"), have been designed to perform primarily audio related functions. However, it has become increasingly important for codecs, such as those complying with AC '97 specification, to perform primarily modem related functions. Modem related functions can require additional modules and peripherals to be controlled by the controller. An example of when an additional module or peripheral and its respective set of registers need to be addressed and controlled through the AC-link is when it is desired to perform a DSP ("Digital Signal Processing") function, such as acoustic echo cancellation, at a point beyond the AC-link and the codec (as opposed to performing the echo cancellation in the controller itself).

Other examples of additional modules or peripherals and their respective sets of registers that need to be addressed and controlled through the AC-link are an LSD ("Line Side Device"), an SSD ("System Side Device"), and an E-PHY ("Ethernet PHYsical-layer interface") device. By way of background, an LSD is a module or peripheral that has been recently devised and added by some manufacturers to a Data Access Arrangement ("DAA") device in order to facilitate the interfacing of the DAA with a codec. A DAA is a peripheral that is widely used in the art and is conventionally comprised of discrete components used to interface with a telephone line. As stated above, recently, the LSD has been added as a module in the DAA to facilitate interfacing between the DAA and a codec. With the recent addition of the LSD to the DAA by some manufacturers, the DAA is comprised of two main modules which are (a) the discrete component module, and (b) the LSD.

The addition of the LSD to the DAA has resulted in the need for addition of a module inside the codec to interface with the LSD. The module inside the codec is the SSD. The interface between the LSD which is outside the codec and the SSD which is inside the codec is performed through what is referred to as a Digital Isolation Barrier ("DIB"). The addition of the LSD and the SSD as recent modules that facilitate codec operations and which facilitate the codec interfacing with a telephone line, has given rise to the need to address and control these recently added modules, namely the LSD and the SSD, through the AC-link and the codec. It is noted that an SSD may also be a module separate from (as opposed to integrated in) the codec. An E-PHY is a device that performs Ethernet related functions in a LAN ("Local Area Network"). The E-PHY may be integrated in the codec or, alternatively, the E-PHY may be a module separate from the codec. Each of these modules or peripherals, e.g. the SSD, LSD, and E-PHY, has a respective set of registers which needs to be addressed and controlled by the controller through the AC-link.

As stated above, in each of the above examples the controller is required to address and control a bank of registers that are accessible to the controller only through the AC-link and the codec. In other words, in order to access modules or peripherals that are located "beyond" the AC-link, the controller must go through both the AC-link and the codec. As such, the controller must comply with the requirements of the AC-link. The requirements of the AC-link stem, in part, from a predetermined timing protocol for AC-link communications, i.e. for communications between the controller and the codec through the AC-link.

One specific requirement of an AC-link complying with the AC '97 specification has to do with timing and speed requirements for reading data by the controller from a register or a peripheral located across the AC-link. Transmission of data between controller 216 and codec 226 through AC-link 218 is performed in 12 outgoing or incoming "slots" following an initial "TAG" slot. According to the AC '97 specification, each "slot" contains up to twenty bits of information used for communication across AC-link 218. The 12 slots following the TAG slot comprise a "frame." The standard rate of transmission of frames through AC-link 218, according to the AC '97 specification, is 48 KHz. In other words, in approximately every 20.8 microseconds, a frame is transmitted across AC-link 218. This rate of transmission of frames across the AC-link is not adjustable for codecs complying with the AC '97 specification.

Moreover, the AC '97 specification imposes an exacting requirement that all read data be returned in the very next frame following the frame in which the read data was requested. In other words, when controller 216 makes a request to read a register located across AC-link 218, the data from the addressed register must be returned to the controller in the very next frame, i.e. within approximately 20.8 microseconds from the read request.

This exacting standard poses a major problem when data to be read is not available because the register addressed is located in a slow peripheral across the AC-link. If a register in a peripheral or module that is located "beyond" the AC-link is accessed by the controller through the AC-link, the controller still expects the read data to be returned in the very next frame following the data request frame. This would leave no more than approximately 20.8 microseconds for the read data to be transferred, from the slow peripheral to the controller. A peripheral or module, such as the LSD, communicating with the codec through the DIB is an example of a slow peripheral. Communications between the codec and LSD through the DIB occur at a frame rate of 16 KHz. Thus, the delay associated with obtaining the read data from a register located in the LSD is too large to have the read data ready and transmitted through the AC-link to the controller while complying with the AC-link's 48 KHz frame rate.

If the read data is not available to the controller requesting the data at the rate of 48 KHz (i.e. in approximately 20.8 microseconds after the request was made), the controller and the host CPU would have to keep polling the codec to find out when valid data is finally available. Thus, in order to retrieve the data requested from a slow peripheral, such as the DIB and LSD combination stated above, the software running in the host CPU must continually poll the codec to find out whether the read data has been passed from the LSD to the codec. This polling process would occupy the host CPU for a very long time. In the example given above, the host CPU must idle for 62.5 microseconds corresponding to the 16 KHz frame rate of the DIB and LSD combination. For modern CPUs operating at speeds over 500 MHz, idling for 62.5 microseconds is a huge waste of CPU time and power. Moreover, during this idling period, the entire system would slow down and a large global delay is introduced in all the various functions to be performed by the host CPU.

Although the problems encountered by a host CPU and a controller in interfacing with a slow peripheral across the AC-link was described by referring to a read operation, similar problems exist when a host CPU and a controller are performing a write into a slow peripheral through the AC-link. In other words, when the peripheral is slow, the host CPU must wait for the write operation to be completed prior to executing another transaction (either another write or a read operation) with the slow peripheral. Thus, as was the case when read data was requested from the slow peripheral, a write into the slow peripheral through the AC-link would require the controller and the host CPU to keep polling the codec to find out when the write operation has been completed and when the slow peripheral is ready for another transaction.

Thus, there is serious need in the art for resolving the problem faced by a host CPU and a controller needing to read data from or write data into a slow peripheral located beyond the AC-link and the codec. In other words, there is serious need in the art to resolve the problem of the controller and host CPU awaiting, for too long, receipt of data from a slow peripheral through the AC-link and the codec or waiting, for too long, the completion of a write into the slow peripheral through the AC-link and the codec. Also, there is need in the art for a method and apparatus that permits the software running on the host CPU to continue to function in a normal manner and run other applications despite the long response time of the slow peripheral in performing read or write operations.

SUMMARY OF THE INVENTION

The present invention is a method and apparatus for facilitating AC-link communications between a controller and a slow peripheral of a codec. The invention resolves the problem faced by a host CPU and a controller needing to read data from or write data into a slow peripheral located beyond the AC-link and the codec. That is the invention resolves the problem of the controller and host CPU awaiting, for too long, receipt of data from a slow peripheral through the AC-link and the codec or waiting, for too long, the completion of a write into the slow peripheral through the AC-link and the codec. The invention is a method and apparatus that permits the software running on the host CPU to continue to function in a normal manner and run other applications despite the long response time of the slow peripheral in performing read or write operations.

In one embodiment, the invention utilizes the GPIO_INT bit (i.e. bit 0 in slot 12 in the AC-link's SDATA_IN line) as an interrupt flag to indicate when data requested by the controller from the slow peripheral is returned and is available to be read by the controller. The GPIO_INT bit can also be used to indicate when a write into the slow peripheral is completed. In this embodiment, a "peripheral ready bit" or a "peripheral ready signal" originated from the slow peripheral is used to set the GPIO_INT bit.

In another embodiment, the invention is directed to controllers which ignore the GPIO_INT bit as a source of interrupt. In order to accommodate these controllers, the invention uses one of the GPIO bits to send the value of the "peripheral ready bit" to the controller. Upon receipt of the peripheral ready bit as one of the GPIO bits from the codec, the controller would interrupt the host CPU and the host CPU is made aware that the data requested from the slow peripheral is returned and is available to be read. The GPIO bit can also be used to indicate that a write into the slow peripheral has been completed.

In yet another embodiment of the invention, the software running on the host CPU successively checks the peripheral ready bit, which is a designated bit in one of the codec's vendor reserved registers, to find out when the peripheral ready bit has been set. When the peripheral ready bit is set, and so detected by the software, the software would be alerted to the fact that the register from which data was requested now contains the requested data, and the requested data is then read by the software. The designated bit can also be used to indicate that a write into the slow peripheral has been completed.

BRIEF DESCRIPTION OF THE DRAWINGS

FIG. 10 is an expanded view of the I/O STATUS slot (or the GPIO status slot); FIG. 10 also includes a table illustrating recommended use of each bit in the GPIO status slot according to the AC '97 specification.

DETAILED DESCRIPTION OF THE INVENTION

The present invention is a method and apparatus for facilitating AC-link communications between a controller and a slow peripheral of a codec. Although the invention is described with respect to a specific embodiment, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
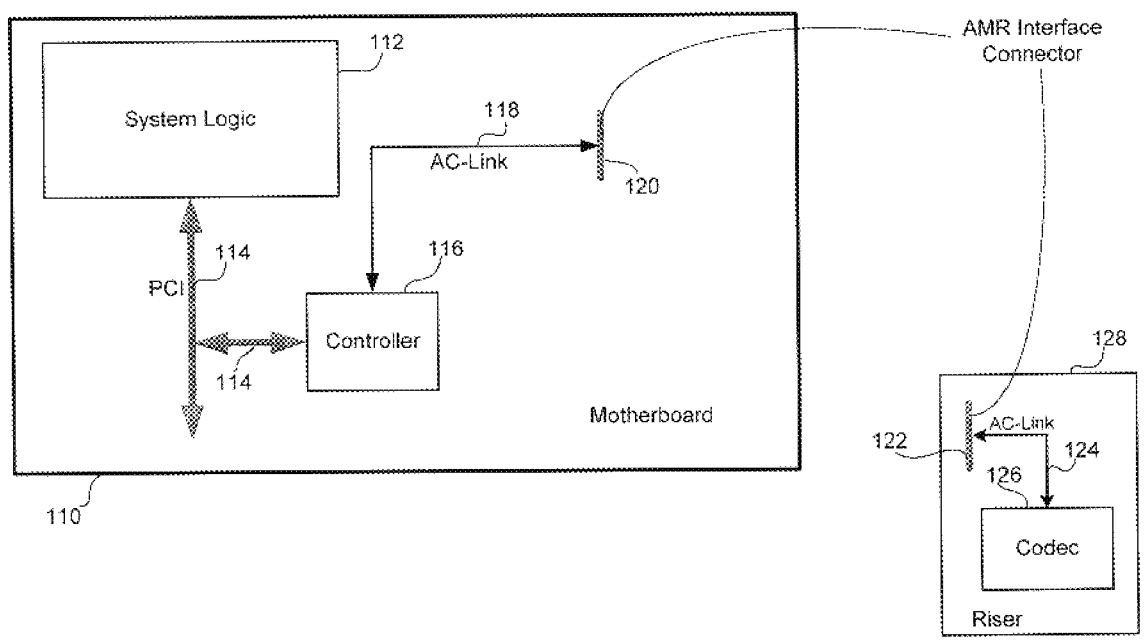
FIG. 1 is a prior art diagram illustrating how a codec is connected to a motherboard and in particular to a controller.
Figure 2:
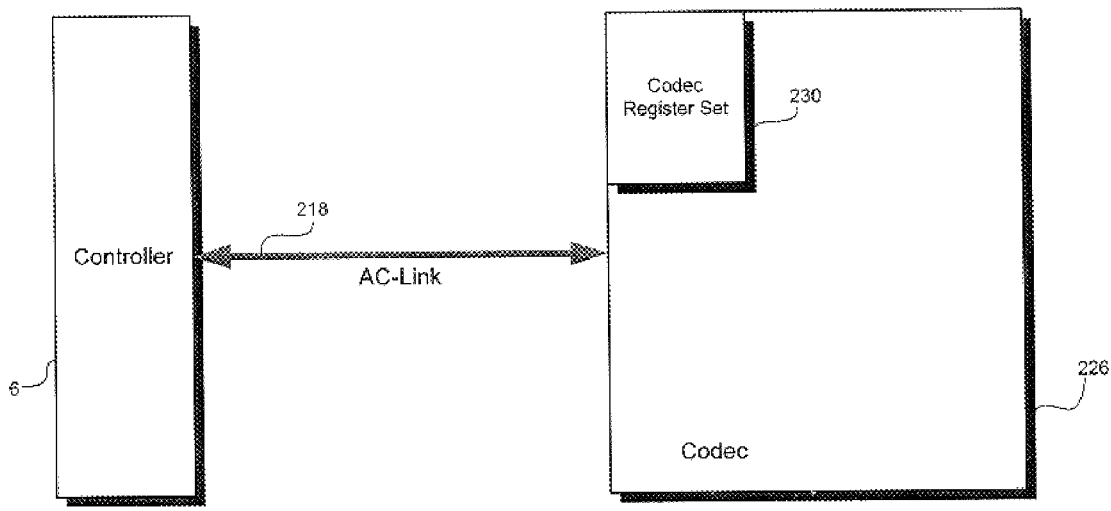
FIG. 2 is a prior art diagram showing a controller coupled to a codec through an AC-link.
Figure 3:
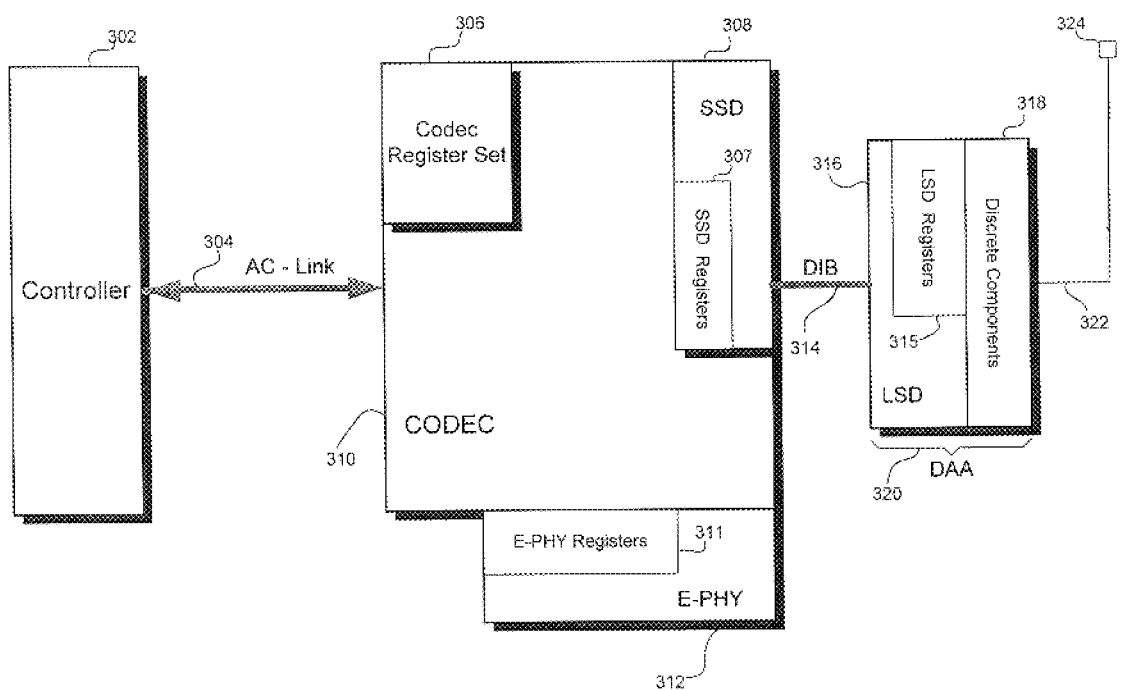
FIG. 3 illustrates a controller addressing a codec and various peripherals and modules through an AC-link.

With respect to the specific embodiments of the invention described in the present application, reference is made to FIG. 3. As shown in FIG. 3, a controller 302 is coupled to a codec 310 through AC-link 304. SSD 308 is shown as being integrated in codec 310. However, as previously mentioned, SSD 308 could have been a separate device not integrated in codec 310. SSD 308 includes a set of registers referred to as SSD registers 307. E-PHY 312 is also shown as being integrated in codec 310. However, as mentioned above, E-PHY 312 may have been a separate device not integrated in codec 310. E-PHY 312 includes a set of registers referred to as E-PHY registers 311.

Codec 310 is coupled to other modules containing their own sets of registers. For example, codec 310 is coupled to LSD 316 through DIB ("Digital Isolation Barrier") 314. In the present application, the combination of LSD 316 and DIB 314 is also referred to as a "peripheral" or as an example of a "slow peripheral." LSD 316 includes a set of registers referred to as LSD registers 315. LSD 316 is part of a DAA ("Data Access Arrangement") device 320. DAA 320 also comprises discrete components module 318. Discrete components module 318 is coupled to an RJ-11 telephone jack 324 via line 322. In the present application, devices such as SSD 308, E-PHY 312, and LSD 316 are also referred to as "peripherals."

Although the embodiment of the invention discussed in the present application discusses specific peripheral modules and devices such as LSD 316, it is known and appreciated that the principles of the present invention is not limited to those specific peripheral modules and devices discussed herein. Moreover, as will become apparent from the following description, the invention applies equally to a situation where a number of slow peripherals and modules, in addition to the LSD and DIB combination, are used.

It is noted that the embodiment of the invention described in the present application is directed to a codec that complies with Intel® AC '97 specification. Intel® AC '97 includes a detailed disclosure of an architecture of a codec and a description of a communication protocol used in the AC-link, as well as a detailed description of the various signals, registers, and timing diagrams of the codec and its controller. Such detailed description set forth in Intel® AC '97 specification is not repeated here.

However, the entire Intel® AC '97 specification which is entitled "AC '97 Component Specification," Revision 2.1, published on May 22, 1998 by Intel® Corporation is hereby incorporated fully by reference into the present application and is referred to as the "AC '97 specification" in this application. Moreover, whenever in the present application reference is made to an "AC-link", it is understood that the AC-link is one that complies with the AC '97 specification. Further, the communication protocol used in the AC-link and described fully in the AC '97 specification is referred to as the "AC '97 communication protocol."

An example of a controller used as controller 302 is any of the controllers embodied into Intel® chip sets which support the desk top Pentium® based personal computers or the mobile Pentium® based computers as well as other chips made by Intel® which have a controller embedded therein. Also, chip sets made by a number of other manufacturers and some PCI based peripherals made by a few other manufacturers include a controller which can be used as controller 302.

Figure 4:
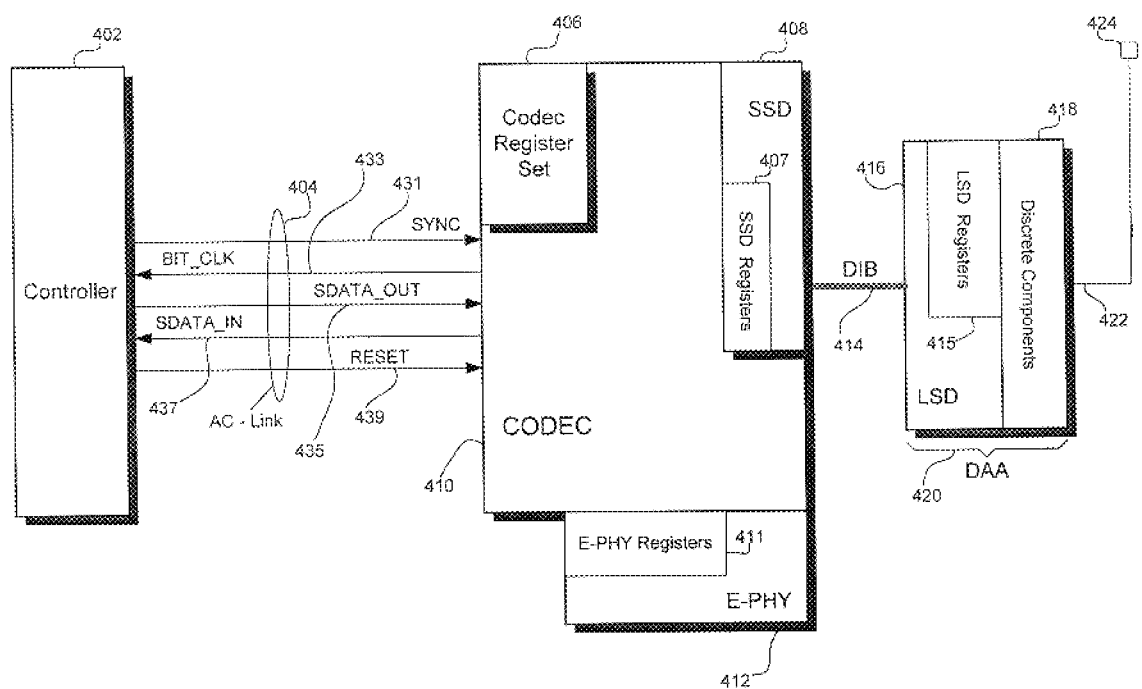
FIG. 4 illustrates a controller addressing a codec and various peripherals and modules through an AC-link where the various lines comprising the AC-link are shown.

Continuing with the specific embodiment of the invention described in the present application, reference is made to FIG. 4. The actual five wires (or lines) enabling physical communication in AC-link 404 are shown in FIG. 4. These five lines are SYNC 431, BIT_CLK 433, SDATA_OUT 435, SDATA_IN 437, and RESET 439 as shown in FIG. 4. FIG. 4 also shows controller 402 (corresponding to controller 302 in FIG. 3) and codec 410 (corresponding to codec 310 in FIG. 3) that are connected to each other via the five lines SYNC 431, BIT_CLK 433, SDATA_OUT 435, SDATA_IN 437, and RESET 439. As stated previously, codec 410 comprises codec register set 406 (corresponding to codec register set 306 in FIG. 3). SSD 408 (corresponding to SSD 308 in FIG. 3) which includes SSD registers 407 (corresponding to SSD registers 307 in FIG. 3) is integrated into codec 410. E-PHY 412 (corresponding to E-PHY 312 in FIG. 3) which includes E-PHY registers 411 (corresponding to E-PHY registers 311) is also integrated into codec 410.

Codec 410 is also coupled to LSD 416 (corresponding to LSD 316 in FIG. 3) through DIB 414 (corresponding to DIB 314 in FIG. 3). LSD 416 includes LSD registers 415 (corresponding to LSD registers 315 in FIG. 3). As stated above, LSD 416 is part of a DAA device 420 (corresponding to DAA device 320 in FIG. 3). DAA 420 also comprises discrete components module 418 (corresponding to discrete components module 318 in FIG. 3). Discrete components module 418 is coupled to an RJ-11 telephone jack 424 (corresponding to telephone jack 324 in FIG. 3) via line 422 (corresponding to line 322 in FIG. 3).

Figure 5:
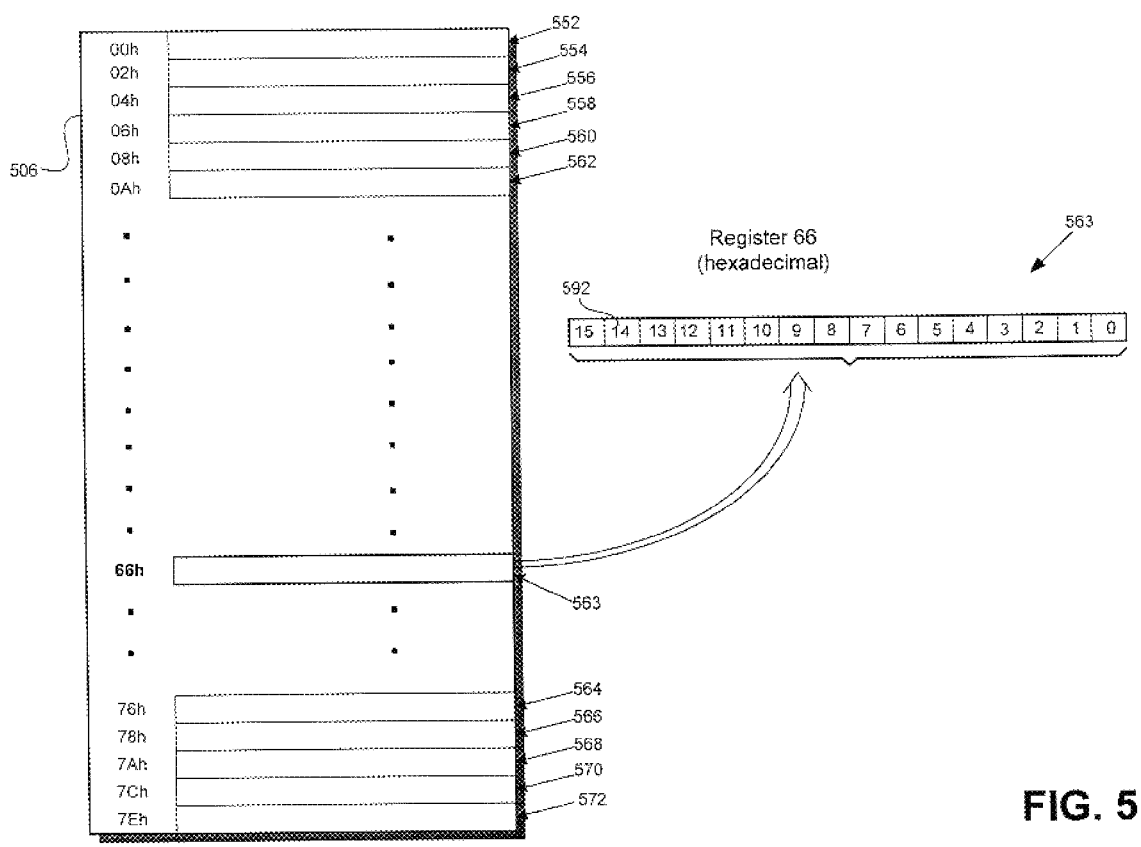
FIG. 5 is an expanded illustration of an AC '97 codec register set, and in particular of register 66 (hexadecimal).

Referring to FIG. 5, codec register set 506 (corresponding to codec register set 306 in FIG. 3) is shown in expanded form. Codec register set 506 which complies with the AC '97 specification consists of a total of 128 registers at addresses 00 (hexadecimal) to 7E (hexadecimal). Examples of these 128 registers shown in FIG. 5 are: register 552 at address 00 (hexadecimal), register 554 at address 02 (hexadecimal), register 556 at address 04 (hexadecimal), register 558 at address 06 (hexadecimal), register 560 at address 08 (hexadecimal), register 562 at address 0A (hexadecimal), register 563 at address 66 (hexadecimal), register 564 at address 76 (hexadecimal), register 566 at address 78 (hexadecimal), register 568 at address 7A (hexadecimal), register 570 at address 7C (hexadecimal), and register 572 at address 7E (hexadecimal).

Registers with addresses between 5A (hexadecimal) and 7A (hexadecimal) in codec register set 506 are generally referred to as "vendor reserved," indicating that these registers can be arbitrarily used by various design engineers and vendors. FIG. 5 also shows register 66 (hexadecimal) in expanded form. This register, and in particular bit 14 of this register (pointed to by numeral 592) are discussed in a later section of this application.

During the operation of codec 410 (FIG. 4), address and control data are transmitted from controller 402 to codec 410 through SDATA_OUT 435 while address and control data are transmitted from codec 410 to controller 420 through SDATA_IN 437. Transmission of address and control data through SDATA_OUT line 435 must comply with the protocol shown in FIG. 6 and transmission of address and control data through SDATA_IN line 437 must comply with its respective protocol shown in FIG. 8.

Figure 6:
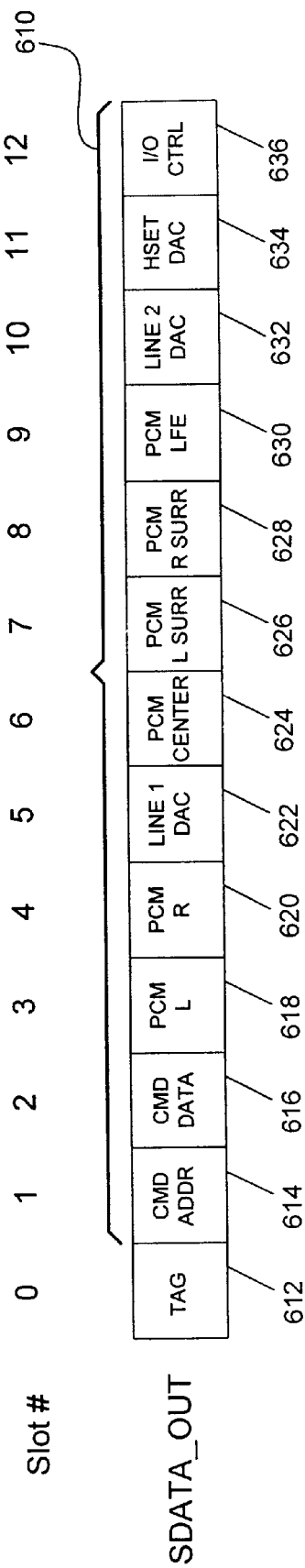
FIG. 6 illustrates the protocol for communication between a controller and a codec according to the AC '97 specification for the SDATA_OUT line.

Referring to FIGS. 4 and 6, transmission of address and control data from controller 402 to codec 410 through SDATA_OUT 435 is performed in 12 outgoing "slots" following an initial "TAG" slot. According to the AC '97 specification, each "slot" contains up to twenty bits of information used for communication between the codec and the controller. The 12 slots following the TAG slot comprise a "frame."

FIG. 6 shows frame 610 comprising slots 1 through 12. Prior to initiation of each frame 610, a "TAG" flags the validity of the entire frame. Slot 0 in FIG. 6, which precedes frame 610, corresponds to TAG 612. Slot 1 is the first slot in frame 610. Slot 1 corresponds to CMD ADDR 614 in FIG. 6. Slot 2 in frame 610 corresponds to CMD DATA 616.

CMD ADDR 614 and CMD DATA 616 are described further below. However, prior to further discussion of CMD ADDR 614 and CMD DATA 616, the remaining slots in frame 610 are briefly discussed here. Slot 3 corresponds to PCM L 618 which is used for digital audio left playback and comprises standard PCM output samples. Slot 4 corresponds to PCM R 620 which is used for digital audio right playback and comprises standard PCM output samples. Slot 5 corresponds to LINE 1 DAC 622 which is for modem DAC input data. Slots 6, 7, 8 and 9 correspond to PCM CENTER 624, PCM L SURR 626, PCM R SURR 628, and PCM LFE 630, respectively. PCM CENTER 624, PCM L SURR 626, PCM R SURR 628, and PCM LFE 630 are used for an optional 6-channel PCM playback mode. Slots 10 and 11 correspond to LINE 2 DAC 632 and HSET DAC 634, respectively. LINE 2 DAC 632 and HSET DAC 634 are used, respectively, for an optional modem line 2 and a handset output. Slot 12 corresponds to I/O CTRL 636 which is used for an optional GPIO control. Slot 12 may also be referred to as a GPIO control slot.

Figure 7:
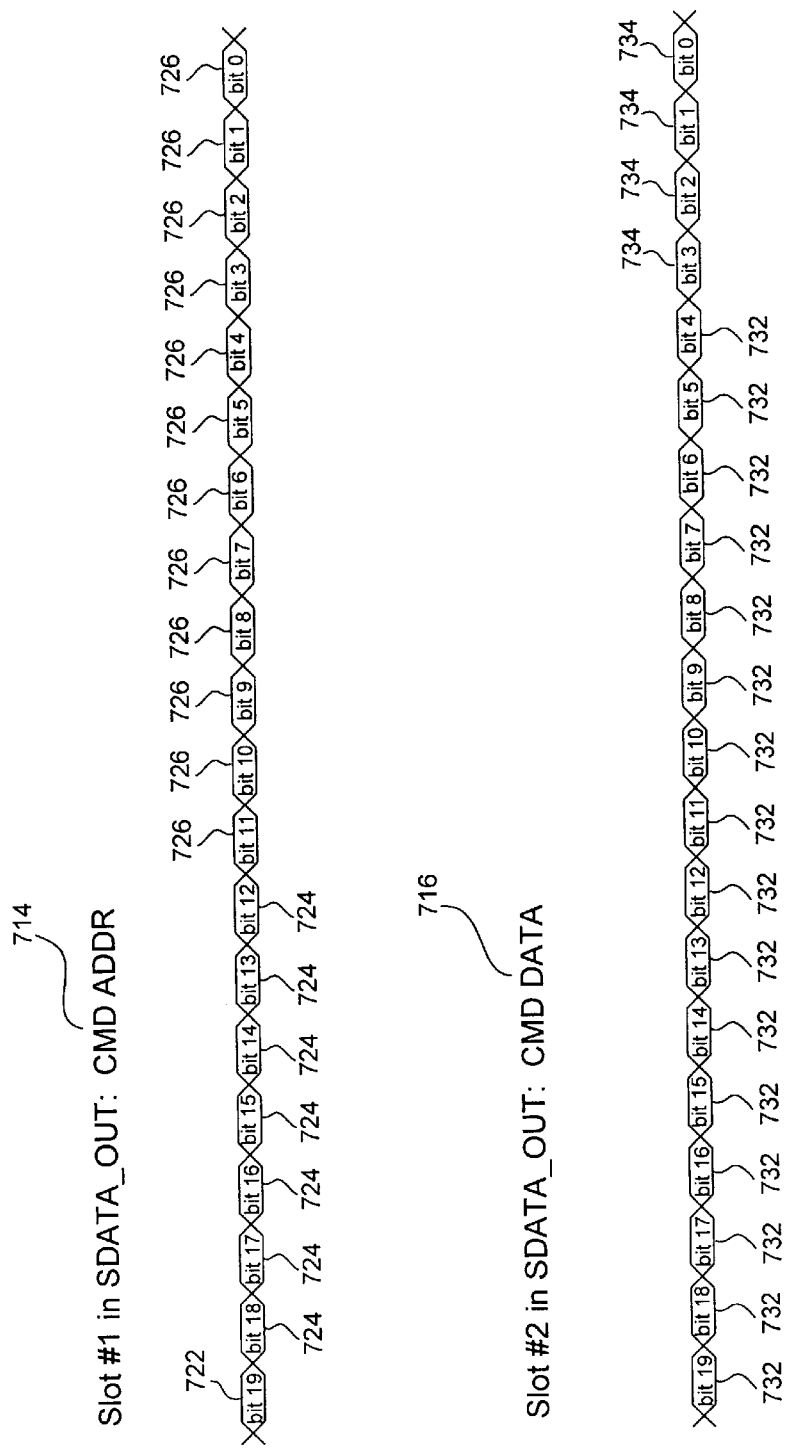
FIG. 7 is an expanded view of the CMD ADDR and CMD DATA slots which are two of the thirteen slots within the AC '97 communication protocol shown in FIG. 6.

As stated above, slots 1 and 2 in frame 610 correspond to CMD ADDR 614 and CMD DATA 616 slots, respectively. FIG. 7 shows an expanded view of the CMD ADDR 614 and CMD DATA 616 slots. CMD ADDR 714 in FIG. 7 corresponds to CMD ADDR 614 in FIG. 6 and is shown as including 20 bits of data. Bit 19 in the CMD ADDR 614 slot, referred to by numeral 722, is a Read/Write control bit. This bit indicates whether controller 402 (FIG. 4) is addressing a particular register in codec register set 406 (FIG. 4) for the purpose of a read or write operation. The following seven bits, i.e. bits 18 through 12, are referred to by numeral 724. Bits 18 through 12 hold the address of the particular register in codec register set 406 (FIG. 4) which is being targeted by controller 402 (FIG. 4) for a read or write operation. The particular register being targeted by the controller for a read or write operation is referred to as the "target register" in this application. The remaining 12 bits, i.e. bits 11 through 0, in the CMD ADDR slot are referred to by numeral 726. These 12 bits, i.e. bits 11 through 0, are reserved and must be "stuffed" with 0's by controller 402.

Continuing with FIG. 7, CMD DATA 716 in FIG. 7 corresponds to CMD DATA 616 in FIG. 6 and is shown as including 20 bits of data. Bits 19 through 4 are referred to by numeral 732. Bits 19 through 4 deliver a 16-bit data to the particular register in codec register set 406 (FIG. 4) which is being addressed by controller 402 (FIG. 4) for a write operation. If the controller was addressing the particular register in codec register set for a read operation, bits 19 through 4 would be stuffed with 0's and, of course, these bits would not be written into any of the registers. The trailing four bits, i.e. bits 3 through 0, are referred to by numeral 734. These four bits, i.e. bits 3 through 0, are reserved and are always stuffed with 0's.

Figure 8:
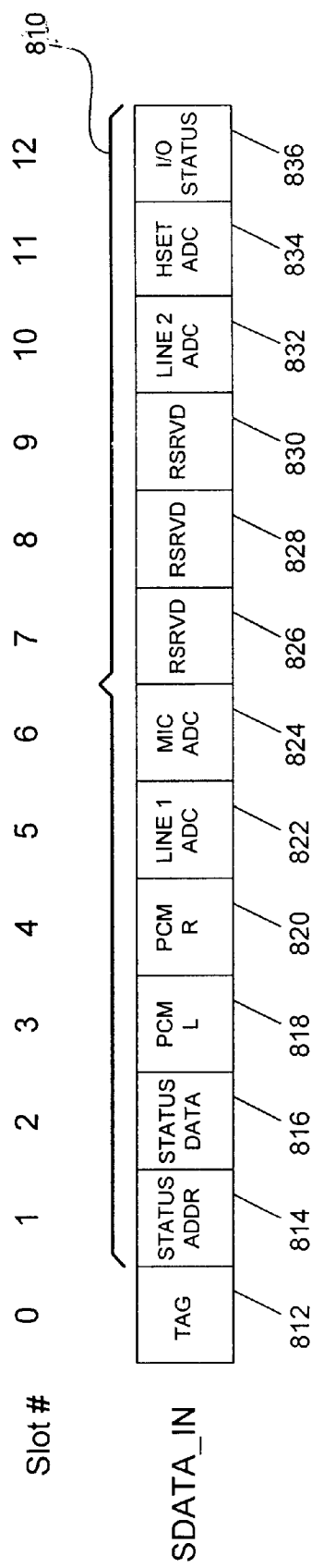
FIG. 8 illustrates the protocol for communication between a controller and a codec according to the AC '97 specification for the SDATA_IN line.

Turning to FIG. 8, transmission of data from codec 410 to controller 402 through SDATA_IN 437 is also performed in 12 incoming "slots" following an initial "TAG" slot. As stated above, according to the AC '97 specification, each "slot" contains up to twenty bits of information used for communication between the codec and the controller. The 12 slots following the TAG slot comprise a "frame." FIG. 8 shows frame 810 comprising slots 1 through 12. Prior to initiation of each frame 810, a "TAG" flags the validity of the entire frame. Slot 0 in FIG. 8, which precedes frame 810, corresponds to TAG 812. Slot 1 is the first slot in frame 810. Slot 1 corresponds to STATUS ADDR 814 in FIG. 8. Slot 2 in frame 810 corresponds to STATUS DATA 816.

STATUS ADDR 814 and STATUS DATA 816 are described further below. However, prior to further discussion of STATUS ADDR 814 and STATUS DATA 816, the remaining slots in frame 810 are briefly discussed here. Slot 3 corresponds to PCM L 818 which is used for digital audio left channel record and comprises standard PCM input samples. Slot 4 corresponds to PCM R 820 which is used for digital audio right channel record and comprises standard PCM input samples. Slot 5 corresponds to LINE 1 ADC 822 which is for modem ADC output data. Slot 6 corresponds to MIC ADC 824 which is for microphone ADC record data. Slots 7, 8 and 9 correspond to RSRVD 826, RSRVD 828, and RSRVD 830, respectively. Slots 7 through 9 are reserved for future use and are always stuffed with 0's according to the AC '97 specification. Slots 10 and 11 correspond to LINE 2 ADC 832 and HSET ADC 834, respectively. LINE 2 ADC 832 and HSET ADC 834 are used, respectively, for an optional modem line 2 and a handset input. Slot 12 corresponds to I/O STATUS 836 which is used for an optional GPIO status. Slot 12 may also be referred to as a GPIO status slot.

Figure 9:
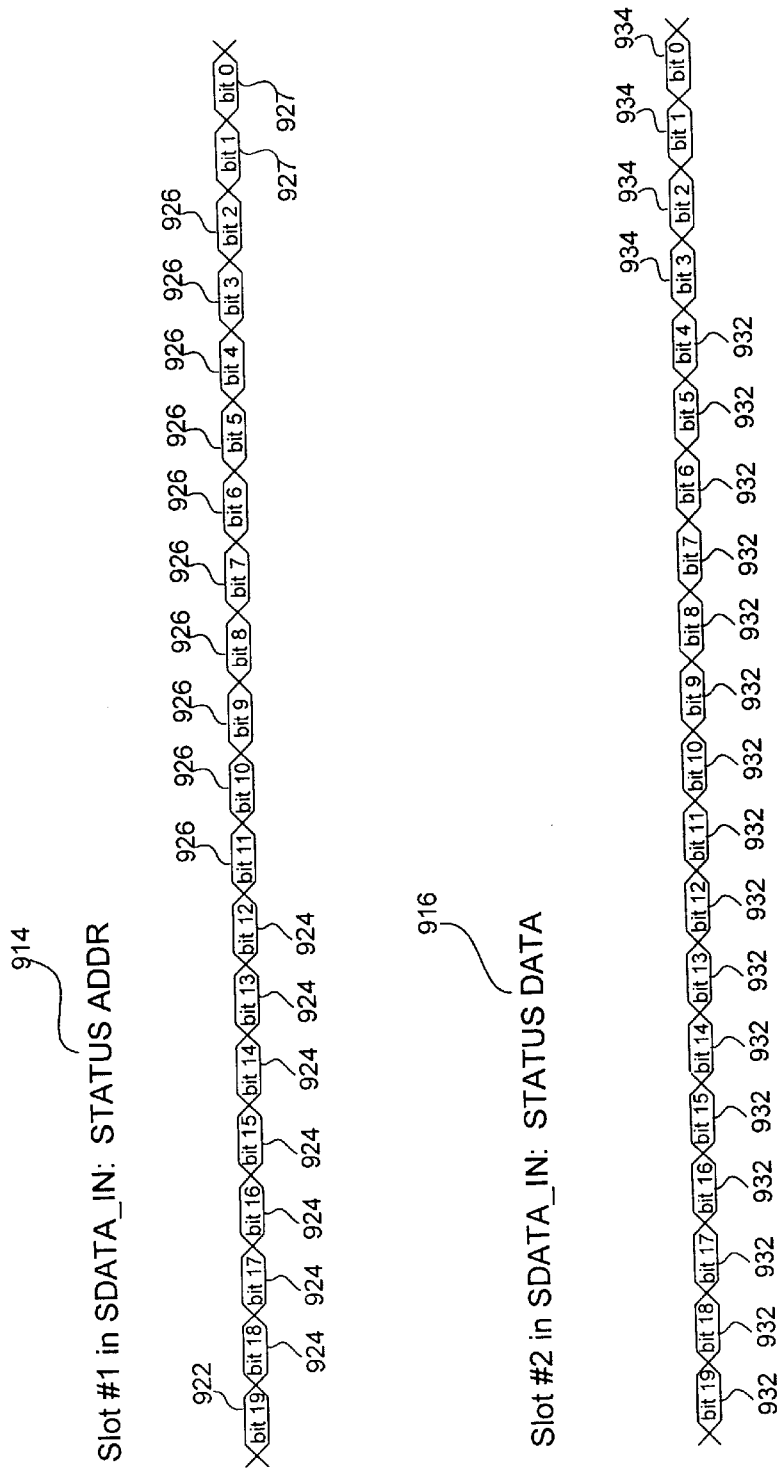
FIG. 9 is an expanded view of the STATUS ADDR and STATUS DATA slots which are two of the thirteen slots within the AC '97 communication protocol shown in FIG. 8.

As stated above, slots 1 and 2 in frame 810 correspond to STATUS ADDR 814 and STATUS DATA 816, respectively. FIG. 9 shows an expanded view of the STATUS ADDR 814 and STATUS DATA 816 slots. STATUS ADDR 914 in FIG. 9 corresponds to STATUS ADDR 814 in FIG. 8 and is shown as including 20 bits of data. Bit 19 in the STATUS ADDR slot, referred to by numeral 922, is a reserved bit which is stuffed with "0" according to AC '97 specification. The following seven bits, i.e. bits 18 through 12, are referred to by numeral 924. Bits 18 through 12 echo the address of the particular register in codec register set 406 (FIG. 4) from which data is being returned during slot 2 (i.e. during STATUS DATA slot 816 in FIG. 8). In other words, bits 18 through 12 echo the address of the target register from which data is to be returned to the controller in the next slot, i.e. in slot 2.

The following ten bits, i.e. bits 11 through 2, in the STATUS ADDR slot are referred to by numeral 926. These 10 bits, i.e. bits 11 through 2, are used as data request flags to obtain data from slots 3 through 12 in the next frame from the codec. The remaining two bits in STATUS ADDR slot 914 are reserved and set to "0" according to the AC '97 specification.

Continuing with FIG. 9, STATUS DATA 916 corresponds to STATUS DATA 816 in FIG. 8 and is shown as including 20 bits of data. Bits 19 through 4 are referred to by numeral 932. Bits 19 through 4 deliver a 16-bit word from the particular register which is being addressed by controller 402 (FIG. 4) for a read operation. The trailing four bits, i.e. bits 3 through 0, are referred to by numeral 934. These four bits, i.e. bits 3 through 0, are reserved and are always stuffed with 0's.

As stated above, slot 12 in frame 810 of FIG. 8 corresponds to I/O STATUS 836 which is used for an optional GPIO status. According to the AC '97 specification, the 20 status (i.e. the data values) of all GPIO inputs and outputs is transmitted from the codec to the controller on slot 12 of every incoming frame (i.e. every frame coming on SDATA_IN from the codec to the controller). An expanded view of slot 12 in frame 810 of FIG. 8, i.e. the I/O STATUS 836 slot, is shown in FIG. 10. As seen in FIG. 10, slot 12, i.e. the GPIO status slot, which is referred to generally by numeral 1036, contains twenty bits of information. Table 1002 in FIG. 10 illustrates recommended use of each bit in the GPIO status slot according to the AC '97 specification. However, the AC '97 suggested use of the GPIO bits in table 1002 in no way diminishes the ability of a design engineer to use the GPIO bits as he or she wishes and in a way that is quite different from that recommended according to the AC '97 specification.

Referring to table 1002 in FIG. 10, the AC '97 recommended bit assignment for the GPIO is briefly discussed. Bit 19 is recommended for use as optional GPIO/HANDSET_TO_LINE2 relay control bit; bit 18 is recommended for use as optional GPIO/Line 2 pulse dial; bit 17 is recommended for us as Loop Current Sense Line 2; bit 16 is recommended for use as Caller ID path enable Line 2; bit 15 is recommended for use as Ring Detect Line 2; bit 14 is recommended for use as Off Hook Line 2; bit 13 is recommended for use as optional GPIO/International Bit 3/Line 1/2 RS; bit 12 is recommended for use as optional GPIO/International Bit 2/Line 1/2 DC; bit 11 is recommended for use as optional GPIO/International Bit 1/Line 1/2 AC; bit 10 is recommended for use as optional GPIO/HANDSET off hook detect; bit 9 is recommended for use as optional GPIO/HANDSET to Line 1 relay control; bit 8 is recommended for use as optional GPIO/Line 1 pulse dial; bit 7 is recommended for use as Loop Current Sense Line 1; bit 6 is recommended for use as Caller ID path enable Line 1; bit 5 is recommended for use as Ring Detect Line 1; bit 4 is recommended for use as Off Hook Line 1; bits 3 through 1 are reserved for use by vendors; and bit 0 is recommended for use as the GPIO_INT bit.

According to the AC '97 specification, the codec must constantly update GPIO status in slot 12 based upon the logic level detected at each of the 16 codec GPIO pins. The GPIO status (data values) are then passed to the controller in slot 12 of the frame through the SDATA_IN line. A typical use for the last bit in slot 12, i.e. the GPIO_INT bit is to detect a change in the logic level of any of the 16 GPIO pins. Once a change in the logic level of any of the 16 codec GPIO pins occurs, the GPIO interrupt bit, i.e. GPIO_INT is set. Some controllers rely on the GPIO_INT coming as the last bit in slot 12 to become aware that an interrupt event has occurred. However, some controllers actually implement their own interrupt schemes by monitoring various GPIO bits as they are transmitted to the controller during slot 12. For these controllers, when a change occurs in one of the GPIO bits that is considered an interrupt event, the controller will then cause an interrupt to the host CPU. In other words, these controllers would just ignore the GPIO_INT bit coming as bit 0 of slot 12.

As stated above, during operation of codec 410 (FIG. 4), line SDATA_OUT 435 is used for transmitting address and control data information from controller 402 to codec 410. A particular register in codec register set 406 is addressed by the controller during CMD ADDR slot 614 (FIG. 6). As explained above, bits 18 through 12 of the CMD ADDR slot 614 contain the address of the particular register in codec register set 406 which is being targeted by controller 402 for a read operation. It is possible that the particular codec register being addressed by bits 18 through 12 of CMD ADDR slot 614 contains the actual data to be returned to the controller. However, according to the disclosure made in the related co-pending application, entitled "method and apparatus for addressing and controlling expansion devices through an AC-link and a codec," Ser. No. 09/432,434, Filed Nov. 2, 1999, and assigned to the assignee of the present application, it is also possible that the particular codec register being addressed by bits 18 through 12 of the CMD ADDR slot 614 contains not the actual data, but the address to a register in a codec peripheral, such as the LSD, wherein that peripheral register, e.g. the LSD register, contains the actual data requested by the controller. In either case, i.e. whether the particular codec register itself contains the data or whether the particular codec register merely contains the address of a peripheral register which in turn contains the requested data, the requested data (also referred to as the "read data") must be returned to the controller in the frame immediately following the frame in which the controller requested the data.

Thus, according to the AC '97 specification, the requested data must be returned to the controller in a frame (i.e. an incoming frame transmitted from the codec to the controller on the SDATA_IN line) immediately following the frame which requested the data (i.e. immediately after the outgoing frame transmitted from the controller to the codec on the SDATA_OUT line). Thus, according to the AC '97 specification, STATUS DATA slot 816 of incoming frame 810 (FIG. 8) which immediately follows an outgoing frame containing CMD ADDR slot 614 (FIG. 6) should return the requested data to the controller. In fact, the requested data should be contained in bits 19 through 4 (referred to by numeral 932 in FIG. 9) of the STATUS DATA slot 916 (FIG. 9).

The above sequence of data request by the controller in one frame and the return of requested data to the controller in the immediately following frame can typically take place without any difficulty. However, the controller's need to access and read data from slow peripherals by going through the AC-link and the codec gives rise to the problems which are resolved by the present invention.

More specifically and as discussed in the background section of this application, the AC-link controller expects the read data to be available approximately 20.8 microseconds after the read data request is made by the controller. However, a slow peripheral would not be able to provide the read data within the 20.8 microsecond time frame. Referring to the specific example of the LSD and DIB combination used in the background section of the present application, the requested data is not returned by the slow peripheral (the slow peripheral in this example being the LSD and DIB combination) until 62.5 microseconds after the read request is made by the controller. It is manifest that any peripheral whose response time is too long to comply with the response time requirement set forth in the AC-link specification is a "slow peripheral" and the present invention is directed to resolving the problems faced by a controller and the host CPU in reading data from or writing data to such a slow peripheral. In the specific example given above, the AC-link required response time is approximately 20.8 microseconds whereas the slow peripheral's actual response time is 62.5 microseconds.

Discussing in more detail the problems associated with a read request from a slow peripheral, when the controller needs to read data from a register located in a slow peripheral the requested data cannot be returned to the controller in the frame immediately following the frame in which the data was requested. As discussed above, an example of a situation where the peripheral addressed by the controller is "slow" is an LSD which is accessed through the DIB.

In one embodiment, the invention resolves the problems caused by a slow peripheral by taking advantage of the GPIO_INT bit, i.e. bit 0 in I/O STATUS slot 836 (slot 12 in FIG. 8). Referring to FIG. 10, I/O STATUS slot 1036 corresponds to I/O STATUS slot 836 in FIG. 8 and bit 0 in the I/O STATUS slot which is referred to by numeral 1004 corresponds to the GPIO_INT bit. Also, in table 1002 of FIG. 10, bit 0 in the I/O STATUS slot referred to by numeral 1006 corresponds to the GPIO_INT bit. The GPIO_INT bit is also referred to as the "interrupt bit" in the present application.

In this embodiment of the invention, the GPIO_INT bit (i.e. bit 0 in slot 12 in SDATA_IN) is used as a flag to indicate when data requested by the controller from a register in a slow peripheral is returned and is available to be read by the controller. This embodiment of the invention is explained by referring to a read data request from the LSD through the codec and the DIB where the combination of the LSD and DIB make a slow peripheral. However, it is manifest that reference to the combination of the LSD and DIB as an example of a slow peripheral does not limit the applicability of the invention to any other slow peripheral from which read data is requested by the controller. Moreover, although the embodiment of the invention is explained by referring to reading data from the slow peripheral, the invention's solution applies also to writing data into the slow peripheral.

In normal operation of the codec, the GPIO_INT bit, i.e. bit 0 in GPIO status slot 1036 (FIG. 10) which is referred to by numeral 1004, is set to a logic level "1" when the codec receives an event from one of its GPIO pins which the codec interprets as an interrupt event. The GPIO_INT bit is normally set in the frame in which the interrupt event on one of the codec's GPIO pins is received. During slot 12 of every frame that is transmitted on SDATA_IN 437 from codec 410 to controller 402 (FIG. 4), the controller receives the GPIO_INT bit as the last bit in slot 12. Moreover, during normal operation, when controller 402 detects a logic level "1" in the GPIO_INT bit, the controller interrupts the host CPU so that the host CPU would know that an interrupt event has occurred.

According to the present invention, a "peripheral ready bit" is generated and OR'ed with all other sources of interrupt. In this embodiment of the invention, the "peripheral ready bit" is set to a logic level "1" in the frame in which the read data returns from the LSD through the DIB. When the read data is returned by the LSD through the DIB, the peripheral ready bit is set to a "1" which in turns sets the GPIO_INT bit to a "1". The setting of the GPIO_INT bit interrupts the host CPU alerting the software which originated the read request to the fact that the requested data has been returned. Thus, utilizing this embodiment of the present invention, the software does not have to continually poll any bits in any registers in order to discover whether or when the requested data from the slow peripheral has been returned. It is noted that in this embodiment of the invention, a state machine (not shown in any of the Figures) inside the codec follows the state of the DIB and LSD to determine when access to the DIB and LSD is complete and when the access is complete the "peripheral ready bit" is set, which in turn sets the GPIO_INT bit.

In an alternative implementation of this embodiment of the invention, instead of a peripheral ready bit, one or more signals originating from the slow peripheral and sent to the codec can be used to set the GPIO_INT bit and no "peripheral ready bit" is used. In other words, a single signal or combination of signals referred to collectively as a "peripheral ready signal" can be sent from the slow peripheral to the codec. The codec's state machine can then, based on the status of the peripheral ready signal, set the GPIO_INT bit to a "1".

Although both implementations of this embodiment of the invention were discussed by specifically referring to a read operation, it is manifest that in either implementation of this embodiment of the invention a peripheral ready bit or a peripheral ready signal can also be used to indicate that a write into the slow peripheral is complete.

Another embodiment of the invention is tailored to work with those controllers which are not built to monitor or rely on the GPIO_INT bit generated by the codec. These controllers implement their own interrupt schemes by actually copying all of the GPIO status bits in slot 12 (referred to as slot 1036 in FIG. 10). The copied GPIO status bits are then monitored by the controller. When the controller detects a change in one of the GPIO bits which is considered an interrupt event, the controller will interrupt the host CPU. In other words, these controllers simply ignore the GPIO_INT bit transmitted by the codec and generate their own interrupt flag based on the data values of the GPIO bits copied by the controller from the codec.

In order to accommodate these controllers which implement their own interrupt schemes and which ignore the GPIO_INT bit coming from the codec, the invention uses one of the GPIO bits, for example one of bits 1 through 3 in slot 1036 of FIG. 10, to send the value of the "peripheral ready bit" to the controller. The choice of which bit in the GPIO status slot (i.e. slot 12 in the SDATA_IN frame) is used to convey the value of the "peripheral ready bit" is quite arbitrary. In this embodiment of the invention, the controller interprets the setting of the peripheral ready bit in the incoming GPIO bits as an interrupt event. Accordingly, once the controller detects that the peripheral ready bit in the incoming I/O STATUS slot (i.e. the GPIO status slot) has been set, the controller interrupts the host CPU, altering the software which originated the read data request to the fact that the requested data has been returned. Thus, utilizing this embodiment of the invention, the host CPU does not have to continually poll any bits in any registers in order to discover whether or when the requested data from the slow peripheral has been returned.

Although this embodiment of the invention was discussed by specifically referring to a read request from a slow peripheral, it is manifest that in this embodiment of the invention a bit in the GPIO status slot can be also used to indicate when a write into the slow peripheral has been completed.

In yet another embodiment of the invention, one of the registers with an address between 5A (hexadecimal) and 7A (hexadecimal) in codec register set 506 (FIG. 5), which are generally referred to as "vendor reserved" registers, is utilized. The choice of which register among registers 5A (hexadecimal) and 7A (hexadecimal) would be used is quite arbitrary. As an example, register 66 (hexadecimal) is used to explain this embodiment of the invention. Referring to FIG. 5, register 66 (hexadecimal) is referred to by numeral 563 and is shown in expanded form. In this embodiment of the invention one of the bits in register 66 (hexadecimal) is used as the "peripheral ready bit." The bit selected in this embodiment of the invention, is bit 14 of registers 66 (hexadecimal). Bit 14 of register 66 (hexadecimal) is referred to by numeral 592 in FIG. 5. The bit selected in one of the codec registers to function as a "peripheral ready bit" is also referred to as the "designated bit" in this application. According to this embodiment of the invention, after the software running on the host CPU causes the controller to make a read data request from a register in a slow peripheral, the software would successively read the "peripheral ready bit," i.e. bit 14 of register 66. When the peripheral ready bit is set, and so detected by the software, the software would be alerted to the fact that the register from which data was requested now contains the requested data, and the requested data is then read by the software.

Thus, by successively checking the peripheral ready bit (which is the designated bit in one of the vendor reserved registers), the host CPU does not need to be interrupted in order for it to receive the returned data. Moreover, the frequency of the successive checks performed by the software on bit 14 of register 66 (hexadecimal) (i.e. the designated bit) can be set such that the host CPU is able to substantially attend to its other functions during the time that the peripheral ready bit is not set.

Although this embodiment of the invention was discussed by specifically referring to a read operation, it is manifest that this embodiment of the invention can also be used to indicate that a write into the slow peripheral is complete.

In all of the invention's embodiments described above, one of the invention's objectives is to allow the host CPU to function in a normal manner despite the fact that the slow peripheral's response time to either a read or a write operation is too long relative to the response time required by the AC-link specification. The present invention thus overcomes the prior art's need for expending the host CPU time and computing power on polling various registers to discover when data from a slow peripheral has been returned to the controller or when a write into the slow peripheral has been completed. For example, if the slow peripheral is the LSD and DIB combination, the host CPU would have had to stall for approximately 62.5 microseconds to accommodate the peripheral's frame rate of 16 KHz. Utilizing the present invention, the host CPU can perform other functions during this 62.5 microseconds and receive the requested data when it has been returned by the peripheral.

Throughout the present application, the terms "peripheral" and "slow peripheral" have been used. It is understood that a "peripheral" or a "slow peripheral" may refer to devices or modules that are in fact integrated in the codec. In other words, a peripheral or a slow peripheral refers to those devices or modules that are integrated in the codec as well as to those devices or modules that are not integrated in the codec.

Thus, a method and apparatus for facilitating AC-link communications between a controller and a slow peripheral of a codec has been described.

What is claimed is:

1. An apparatus comprising:
   a controller coupled to a codec via an AC-link;
   a peripheral coupled to said codec;
   said peripheral generating a peripheral ready signal in response to a read data request from said controller, said peripheral ready signal causing said codec to transmit an interrupt bit to said controller, said interrupt bit alerting said controller as to return of data from said peripheral responsive to said read data request.

2. The apparatus of claim 1 wherein a response time of said peripheral to said read data request is longer than a required AC-link response time.

3. The apparatus of claim 1 wherein said codec transmits said interrupt bit to said controller via said AC-link.

4. The apparatus of claim 1 wherein said interrupt bit is a GPIO_INT bit transmitted from said codec to said controller on a SDATA_IN line.

5. The apparatus of claim 4 wherein said GPIO_INT bit is a last bit in a slot 12 of a frame transmitted from said codec to said controller on said SDATA_IN line.

6. An apparatus comprising:
   a controller coupled to a codec via an AC-link;
   a peripheral coupled to said codec;
   said peripheral generating a peripheral ready signal in response to a write operation initiated by said controller, said peripheral ready signal causing said codec to transmit an interrupt bit to said controller, said interrupt bit alerting said controller as to completion of said write operation.

7. The apparatus of claim 6 wherein a response time of said peripheral for completion of said write operation is longer than a required AC-link response time.

8. The apparatus of claim 6 wherein said codec transmits said interrupt bit to said controller via said AC-link.

9. The apparatus of claim 6 wherein said interrupt bit is a GPIO_INT bit transmitted from said codec to said controller on a SDATA_IN line.

10. The apparatus of claim 9 wherein said GPIO_INT bit is a last bit in a slot 12 of a frame transmitted from said codec to said controller on said SDATA_IN line.

11. A method comprising the steps of:
coupling a controller to a codec via an AC-link;
coupling a peripheral to said codec;
said peripheral generating a peripheral ready signal in response to a read data request from said controller;
said peripheral ready signal causing said codec to transmit an interrupt bit to said controller;
said interrupt bit alerting said controller as to return of data from said peripheral responsive to said read data request.

12. The method of claim 11 wherein a response time of said peripheral to said read data request is longer than a required AC-link response time.

13. The method of claim 11 wherein said codec transmits said interrupt bit to said controller via said AC-link.

14. The method of claim 11 wherein said interrupt bit is a GPIO_INT bit transmitted from said codec to said controller on a SDATA_IN line.

15. The method of claim 14 wherein said GPIO_INT bit is a last bit in a slot 12 of a frame transmitted from said codec to said controller on said SDATA_IN line.

16. A method comprising the steps of:
coupling a controller to a codec via an AC-link;
coupling a peripheral to said codec;
said peripheral generating a peripheral ready signal in response to a write operation initiated by said controller;
said peripheral ready signal causing said codec to transmit an interrupt bit to said controller;
said interrupt bit alerting said controller as to completion of said write operation.

17. The method of claim 16 wherein a response time of said peripheral for completion of said write operation is longer than a required AC-link response time.

18. The method of claim 16 wherein said codec transmits said interrupt bit to said controller via said AC-link.

19. The method of claim 16 wherein said interrupt bit is a GPIO_INT bit transmitted from said codec to said controller on a SDATA_IN line.

20. The method of claim 19 wherein said GPIO_INT bit is a last bit in a slot 12 of a frame transmitted from said codec to said controller on said SDATA_IN line.

21. An apparatus comprising:
a controller coupled to a codec via an AC-link;
a peripheral coupled to said codec;
said peripheral generating a peripheral ready bit in response to a read data request from said controller, said peripheral ready bit being transmitted from said codec to said controller, said controller generating an interrupt bit in response to receiving said peripheral ready bit.

22. The apparatus of claim 21 wherein a response time of said peripheral to said read data request is longer than a required AC-link response time.

23. The apparatus of claim 21 wherein said codec transmits said peripheral ready bit to said controller via said AC-link.

24. The apparatus of claim 21 wherein said peripheral ready bit is a bit in an I/O STATUS slot transmitted from said codec to said controller on a SDATA_IN line.

25. An apparatus comprising:
a controller coupled to a codec via an AC-link;
a peripheral coupled to said codec;
said peripheral generating a peripheral ready bit in response to a write operation initiated by said controller, said peripheral ready bit being transmitted from said codec to said controller, said controller generating an interrupt bit in response to receiving said peripheral ready bit.

26. The apparatus of claim 25 wherein a response time of said peripheral for completion of said write operation is longer than a required AC-link response time.

27. The apparatus of claim 25 wherein said codec transmits said peripheral ready bit to said controller via said AC-link.

28. The apparatus of claim 25 wherein said peripheral ready bit is a bit in an I/O STATUS slot transmitted from said codec to said controller on a SDATA_IN line.

29. An apparatus comprising:
a controller coupled to a codec via an AC-link, said codec including a plurality of codec registers;
a peripheral coupled to said codec;
said peripheral causing a designated bit in one of said plurality of codec registers to be set and reset in response to a read data request from said controller, said designated bit alerting said controller as to return of data from said peripheral responsive to said read data request.

30. The apparatus of claim 29 wherein a response time of said peripheral to said read data request is longer than a required AC-link response time.

31. The apparatus of claim 29 wherein said codec transmits said designated bit to said controller via said AC-link.

32. The apparatus of claim 29 wherein said one of said plurality of codec registers is a register located at address 66 (hexadecimal) and said designated bit is bit 14.

33. An apparatus comprising:
a controller coupled to a codec via an AC-link, said codec including a plurality of codec registers;
a peripheral coupled to said codec;
said peripheral causing a designated bit in one of said plurality of codec registers to be set and reset in response to a write operation initiated by said controller, said designated bit alerting said controller as to completion of said write operation.

34. The apparatus of claim 33 wherein a response time of said peripheral for completion of said write operation is longer than a required AC-link response time.

35. The apparatus of claim 33 wherein said codec transmits said designated bit to said controller via said AC-link.

36. The apparatus of claim 33 wherein said one of said plurality of codec registers is a register located at address 66 (hexadecimal) and said designated bit is bit 14.

* * * * *